United States Patent
Weissenbach et al.

(10) Patent No.: US 12,181,184 B2
(45) Date of Patent: Dec. 31, 2024

(54) HEATER

(71) Applicant: TRUMA GERÄTETECHNIK GMBH & CO. KG, Putzbrunn (DE)

(72) Inventors: Victor Weissenbach, Putzbrunn (DE); Elmar Ströhle, Putzbrunn (DE); Dennis Reininger, Putzbrunn (DE); Robert Markesic, Putzbrun (DE); Robert Demmel, Putzbrunn (DE)

(73) Assignee: TRUMA GERÄTETECHNIK GMBH & CO. KG, Putzbrunn (DE)

( * ) Notice: Subject to any disclaimer, the term of this patent is extended or adjusted under 35 U.S.C. 154(b) by 66 days.

(21) Appl. No.: 17/753,903

(22) PCT Filed: Jul. 29, 2020

(86) PCT No.: PCT/EP2020/000137
§ 371 (c)(1),
(2) Date: Mar. 17, 2022

(87) PCT Pub. No.: WO2021/052611
PCT Pub. Date: Mar. 25, 2021

(65) Prior Publication Data
US 2022/0371395 A1    Nov. 24, 2022

(30) Foreign Application Priority Data
Sep. 18, 2019 (DE) ............... 10 2019 006 554.9

(51) Int. Cl.
*B60H 1/00*     (2006.01)
*B60H 1/22*     (2006.01)
(Continued)

(52) U.S. Cl.
CPC ....... *F24H 9/2085* (2013.01); *B60H 1/00357* (2013.01); *B60H 1/0073* (2019.05);
(Continued)

(58) Field of Classification Search
USPC .......................................................... 237/19
See application file for complete search history.

(56) References Cited

U.S. PATENT DOCUMENTS

| 5,456,408 A | * | 10/1995 | Appel | ................ B60H 1/2206 237/12.3 C |
| 5,825,974 A | * | 10/1998 | Hutton | ................ H05B 1/02 219/508 |

(Continued)

FOREIGN PATENT DOCUMENTS

| CH | 354232 A | 5/1961 |
| DE | 44 08 801 C2 | 10/2002 |

(Continued)

OTHER PUBLICATIONS

"Truma VarioHeat," Truma Geraetetechnik GmbH & Co. KG operation manual, Apr. 1, 2018.
(Continued)

*Primary Examiner* — Steven B McAllister
*Assistant Examiner* — John E Bargero
(74) *Attorney, Agent, or Firm* — McNees Wallace & Nurick LLC

(57) ABSTRACT

This invention relates to a heater. A combustion air blower feeds combustion air to a burner device. The burner device burns a gas-air mixture from the combustion air and a fuel and serves for heating air. A circulating air blower discharges heated air from the heater. A control device acts on at least one component of the heater, wherein a night mode parameter set associated with an operation of the heater in a night mode and a default parameter set are stored in a data storage device. After an activation of the night mode, the control device accesses the night mode parameter set and (Continued)

uses the same for acting on the component. The night mode parameter set effects a reduction of background noise generated by the heater.

13 Claims, 1 Drawing Sheet

(51) Int. Cl.
| | |
|---|---|
| *F24H 3/02* | (2022.01) |
| *F24H 6/00* | (2022.01) |
| *F24H 9/20* | (2022.01) |
| *F24H 9/28* | (2022.01) |
| *F24H 15/176* | (2022.01) |
| *F24H 15/35* | (2022.01) |
| *F24H 15/36* | (2022.01) |
| *F24H 15/436* | (2022.01) |
| *F24H 15/20* | (2022.01) |
| *F24H 15/204* | (2022.01) |
| *F24H 15/208* | (2022.01) |
| *F24H 15/25* | (2022.01) |
| *F24H 15/254* | (2022.01) |
| *F24H 15/281* | (2022.01) |
| *F24H 15/395* | (2022.01) |

(52) U.S. Cl.
CPC ........... *B60H 1/2206* (2013.01); *F24H 3/025* (2013.01); *F24H 6/00* (2013.01); *F24H 9/28* (2022.01); *F24H 15/176* (2022.01); *F24H 15/35* (2022.01); *F24H 15/36* (2022.01); *F24H 15/436* (2022.01); *B60H 2001/006* (2013.01); *F24H 15/20* (2022.01); *F24H 15/204* (2022.01); *F24H 15/208* (2022.01); *F24H 15/25* (2022.01); *F24H 15/254* (2022.01); *F24H 15/281* (2022.01); *F24H 15/395* (2022.01)

(56) References Cited

U.S. PATENT DOCUMENTS

| | | | |
|---|---|---|---|
| 6,109,339 A | * | 8/2000 | Talbert ................. F24F 5/0096 454/243 |
| 10,415,841 B2 | | 9/2019 | Deilmann et al. |
| 2011/0257795 A1 | * | 10/2011 | Narayanamurthy .. F24F 5/0046 700/277 |
| 2015/0369509 A1 | | 12/2015 | Schwarz et al. |
| 2020/0348076 A1 | * | 11/2020 | Brooke ................. F25D 29/00 |
| 2021/0372631 A1 | * | 12/2021 | Morimoto ................ F24D 3/08 |

FOREIGN PATENT DOCUMENTS

| | | |
|---|---|---|
| DE | 102006036432 A1 | 2/2008 |
| DE | 102013113883 A1 | 6/2015 |
| EP | 1717514 A1 | 11/2006 |
| EP | 2 116 771 A1 | 11/2009 |
| EP | 2492607 A1 | 8/2012 |
| EP | 2 954 647 B1 | 3/2019 |
| JP | S60142154 A | 7/1985 |
| KR | 101406368 B1 | 6/2014 |
| WO | 9628313 A1 | 9/1996 |
| WO | 2019038023 A1 | 2/2019 |

OTHER PUBLICATIONS

"Truma CP plus VarioHeat control panel," Truma Geraetetechnik GmbH & Co. KG operation manual, Mar. 1, 2018.
"Truma VarioHeat comfort," Truma, Jun. 26, 2024, www.amazon.com.
"Truma VarioHeal: comfort CP plus," Jun. 1, 2019, www.obelink.com.
"Truma VarioHeat Comfort CP Plus Heizung," Jun. 26, 2024, www.obelink.com.

* cited by examiner

HEATER

This invention relates to a heater which at least serves for heating air (e.g. room air).

BACKGROUND OF THE INVENTION

In the prior art, heaters are known that generate thermal energy by the combustion of propane or butane. The energy is transmitted to air or other fluids, e.g. water, via heat exchangers. In each case, blowers are provided for the burning process and for discharging the heated air The burning process and above all the operation of the blowers involve the generation of noise (see e.g. DE 44 08 801 C2). In particular during night time or another resting time (e.g. during the siesta) this can be disturbing. The background noise can be all the more negative when the heater is employed in a confined space, e.g. a caravan, a mobile home or a boat. It generally is desired that the heater also is operated during night time so that it is no option to switch off the heater. Therefore, e.g. DE 10 2006 036 432 A1 provides a reduction of the blower output during night operation.

EP 2 954 647 B1 for example provides a night mode in which an energy consumption of a heating or air-conditioning system will be reduced. Such a night mode will be activated proceeding from the data of an acceleration sensor of a smartphone.

The object underlying the present invention consists in proposing a heater that provides for a noise-reduced operation.

BRIEF DESCRIPTION OF THE INVENTION

The invention achieves the object by a heater comprising a burner device, a combustion air blower, a circulating air blower, a control device and a data storage device, wherein the combustion air blower feeds combustion air to the burner device, wherein the burner device burns a gas-air mixture of the combustion air and a gaseous fuel or a fuel converted into a gaseous state, wherein the burner device at least serves for heating air, wherein the circulating air blower discharges heated air from the heater, wherein the control device acts on at least one component of the heater, wherein at least one night mode parameter set associated with an operation of the heater in a night mode, and a default parameter set associated with an operation of the heater in a mode different from the night mode are stored in the data storage device, wherein after an activation of the night mode the control device accesses the associated night mode parameter set and uses the same for acting on the at least one component, and wherein the night mode parameter set effects a reduction of background noise generated by the heater.

The fuel for example is a combustible gas (e.g. propane or butane or a mixture) or diesel. The air to be heated is room air, for example. The heater is used for example in a movable interior space, as it is provided e.g. by caravans, mobile homes or boats.

The control device controls the heater by acting on at least one component proceeding from parameter sets. At least one parameter set is associated with a night mode, wherein the specification of the parameters involves a reduction of noises that are generated by the heater. Thus, the heater is quieter in the night mode. The night mode can of course also be activated regardless of the time of day so that the designation can also be "sleep mode" in the alternative. The night mode thus differs from the other mode, which is associated with the default parameter set, with respect to the noises generated. Such mode hence would be a day mode, for example.

The components include e.g. the burner device, the combustion air blower or the circulating air blower or other components of the heater which have an influence on the generation of noise.

In the following, parameters are described which the control device takes from the night mode parameter set and with which the control device acts on individual components of the heater.

One embodiment consists in that the control device takes a lower temperature tolerance value from the night mode parameter set, that in the case that a temperature dependent on the heater is lower than a specifiable temperature setpoint value by more than the lower temperature tolerance value, the control device acts on the heater in a correcting manner, and that an amount of the lower temperature tolerance value is greater than an amount of a lower temperature tolerance value of the default parameter set. In this embodiment, the switching hysteresis of the heater is increased—at least in the direction of falling below a desired temperature. For this purpose, larger deviations of a temperature generated by the heater—in particular the temperature of the air heated by the heater—are tolerated, before the heater is acted upon in a controlling manner, e.g. by restarting the burner device. Due to this greater tolerance to the decrease in temperature, the number of burning processes is reduced.

One embodiment consists in that the control device takes an upper temperature tolerance value from the night mode parameter set, that in the case that a temperature dependent on the heater is higher than a specifiable temperature setpoint value by more than the upper temperature tolerance value, the control device acts on the heater in a correcting manner, and that an amount of the upper temperature tolerance value is greater than an amount of an upper temperature tolerance value of the default parameter set. In this embodiment, the switching hysteresis of the heater is increased—in the direction of exceeding a desired temperature. In this embodiment, temperatures above the desired temperature set e.g. by the user are tolerated, which have a greater difference to the setpoint than would be usual with the default parameters. In one embodiment, the action on the heater is the termination of the heating process. Thus, the burner device for example is switched off more rarely than would be intended according to the default parameter set.

In one embodiment, the switching hysteresis in particular relates to the temperature difference between a desired room temperature and an actual room temperature. The desired room temperature can be specified for example by a user of the heater, whereas the actual room temperature is determined for example by a temperature sensor arranged in the room. The two aforementioned embodiments correspondingly refer to deviations of the actual room temperature above or below the desired room temperature. In the night mode parameter set, larger deviations are tolerated than in the default parameter set.

According to one embodiment it is provided that the control device takes a temperature tolerance range from the night mode parameter set, that in the case that the temperature dependent on the heater lies outside the temperature tolerance range by a specifiable temperature setpoint value, the control device acts on the heater in a correcting manner, and that an amount of the temperature tolerance range is greater than an amount of a temperature tolerance range of the default parameter set. In this embodiment, the night mode parameter set comprises a larger tolerance band around a setpoint of the temperature than the default parameter set. In this way, larger deviations in a positive and a negative direction are tolerated than in normal operation, before acting on the heater. The action includes for example the interruption or the (re-) start of a burning process. The larger tolerance range is intended to provide a quieter operation of the heater. When in each of the two aforementioned embodiments an individual tolerance value for the deviation of the actual temperature from the desired temperature has been changed in a positive or a negative direction for the night mode parameter set, a complete broadening of a tolerance band as such is effected in this embodiment on transition from the default parameter set to the night mode parameter set.

One embodiment provides that the heater can be operated at a plurality of power levels, that the control device takes an upper temperature limit value from the night mode parameter set, and that in the case that a temperature dependent on the heater is higher than a specifiable temperature setpoint value by more than the upper temperature limit value, the control device reduces a set power level of the heater to a weaker power level and maintains an existing burning process of the burner device. The heater can be operated at different power levels, between which larger or smaller power gaps exist, depending on the embodiment. When it is now detected in the night mode that a desired temperature is exceeded above an upper temperature limit value, it is provided that the set power level is reduced, but a burning process of the burner device is maintained, i.e. in particular is not terminated. In one embodiment, the temperature dependent on the heater is the temperature of the air discharged from and in particular blown out of the heater and thus also of the heated air. In one embodiment, by contrast, it is provided that according to the default parameter set a burning process is terminated upon exceedance of the temperature setpoint value beyond a corresponding temperature limit value.

When an embodiment for example refers to a temperature setpoint value or another set or specified value or a set level, this preferably results from the action of a user, a presetting or another action on the heater.

One embodiment consists in that the heater can be operated at a plurality of power levels, that the control device takes a limit power level from the night mode parameter set, and that the control device permits an operation of the heater at only one power level, which is lower—i.e. weaker—than the limit power level. In this embodiment, an upper power level is defined, wherein the heater can only be operated at power levels below the same. As the power levels involve an increasing noise level, a power level that is too high, i.e. too loud, thus is not offered. Hence, at least one power level—at least the strongest power level—is blocked. The connection between noise level and power level often results from the speed of the combustion air motor when feeding the combustion air to the burner device for the burning process.

One embodiment provides that the circulating air blower can be operated at a plurality of power levels, that the control device takes a circulating air blower power level from the night mode parameter set, that in the case that heated air is to be discharged from the heater, the control device sets the circulating air blower to the circulating air blower power level, and that the circulating air blower power level is the weakest power level of the power levels of the circulating air blower. During the night mode, the heater thus at least serves as a room heater and correspondingly for heating air. For this purpose, the heated air must be discharged from the heater, which is accomplished via the circulating air blower. In the night mode parameter set it now is provided that the control device operates the circulating air blower maximally at the lowest power level, which in general also involves the lowest generation of noise.

One embodiment consists in that the control device takes an acceleration time period from the night mode parameter set, that in the case that the control device increases the circulating air blower to a specified setpoint speed, the control device increases the speed within the acceleration time period—for example from a given speed—to the specified setpoint speed, and that the acceleration time period is greater than an acceleration time period of the default parameter set. In other words: A speed of the circulating air blower is increased more slowly in the night mode than e.g. in the day mode. The circulating air blower discharges the heated air from the heater. In this embodiment, the speed of the circulating air blower is increased more slowly in the night mode than according to the default parameter set. This will also reduce the generation of noise.

One embodiment provides that the control device takes a burner start scheme for starting a burning process of the burner device from the night mode parameter set and uses the same for starting a burning process, that the burner start scheme of the night mode provides at least the following steps: that in an initialization step—in particular as part of the night mode or as part of a mode differing from the night mode—the control device varies the speed of a motor of the combustion air blower, until the burning process starts in the burner device, that the control device stores the speed at which the burning process starts in the data storage device as a default value, and that during a start of the burning process in the night mode the control device takes the stored default value from the data storage device and sets the speed of the motor to the default value, and that according to a burner start scheme of the default parameter set the control device varies the speed of the motor at each start of the burning process, until the burning process starts in the burner device. Depending on the embodiment, the initialization step is a step during the night mode or a step that is carried out during the mode differing from the night mode—preferably the mode with which the default parameter set is associated. In one embodiment, the speed of the motor of the combustion air blower is decreased according to the default parameter set during the start of a burning process, proceeding from a firmly specified starting value, until the burning process starts. In the night mode, by contrast, a speed value is set at which a burning process previously could be started. This speed—known from the previous operation and hence from the concrete application situation—in general is smaller than the starting value that is provided in the standard burner start scheme. Thus, particularly high speeds are avoided during the night mode. The procedure according to the default parameter set is described for example in EP 2 116 771 B1.

In one embodiment it is provided that the starting value of the speed that is specified according to the burner start scheme of the default parameter set is dependent on the temperature (or a temperature range) of the combustion air. Hence, in this embodiment a plurality of starting values—each related to a temperature value or a temperature range—are stored or a functional relationship between the starting value and the temperature of the combustion air is stored. Proceeding from the measured temperature value, the associated starting value then is used in order to reduce the speed until starting of the burning process.

According to one embodiment it is provided that the control device takes a reduction value from the night mode parameter set, and that on control of the burner device to a specified temperature setpoint value, the control device controls the burner device to the temperature setpoint value reduced by the reduction value. In this embodiment, the heater thus is not controlled to the actually desired temperature setpoint value or to the temperature setpoint value specified by a user, but is controlled to a temperature value reduced by the reduction value. The temperature setpoint value—for example specified by the user—thus is decreased by the reduction value, and this value is then used for controlling the heater. Thus, the aim is a lower temperature, and therefore a smaller temperature difference also is to be compensated. This will likewise reduce background noise. In one embodiment, the reduction value is 1° C., for example.

One embodiment consists in that a fluid container is present, that the burner device not only serves for heating air, but also for heating a fluid contained in the fluid container, that the control device takes a prioritization from the night mode parameter set, and that in the case that air and fluid are to be heated at the same time, the control device acts on the component of the heater in dependence on the prioritization in such a way that thermal energy generated by the burner device primarily serves for heating the air or for heating the fluid. The fluid for example is water, e.g. sanitary or service water. In this embodiment, the heater serves as a kind of room heater and also as a fluid or water heater. With this dual function, an importance for heating the air or the fluid is specified in this embodiment. In particular, this can have an influence on the feeding of the fuel so that here e.g. the opening or closing of a valve (e.g. gas valve) can occur more rarely.

In a development of the preceding embodiment it is provided that the prioritization is such that the thermal energy primarily serves for heating the air. Thus, in this embodiment, in the case that air and fluid are to be heated, heating of the air is more important in the night mode. This avoids, for example, switching processes that occur e.g. when the set temperature of the fluid is reached, but the air temperature still is below the setpoint.

One embodiment consists in that the control device takes a display information from the night mode parameter set and transmits the same to an indicating unit for display. The information for example is the notice that the user should open the flaps of the heated air vents. This would allow to reduce the speed of the circulating air blower so that a quieter and more constant operation of the heater is obtained.

In detail, there is a wide variety of possibilities for designing and further developing the heater according to the invention. On the one hand, reference is made to the claims subordinate to the independent claims, and on the other hand to the following description of exemplary embodiments in conjunction with the drawing.

DETAILED DESCRIPTION OF THE INVENTION

Figure 1:
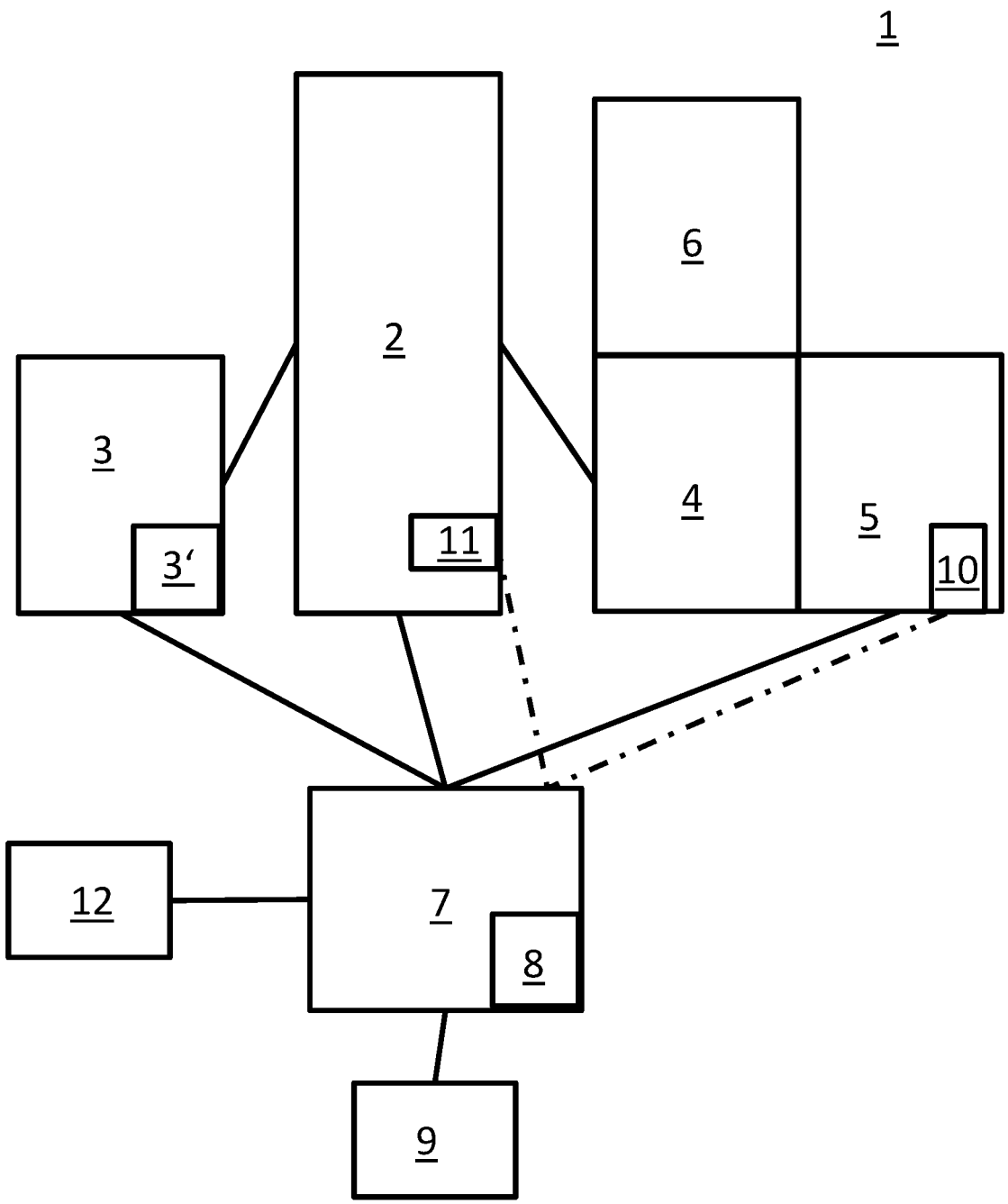
FIG. 1 shows a schematic representation of the heater.

FIG. 1 schematically shows the components of an exemplary embodiment of a heater 1, which here serves for heating air and a fluid.

The central component is the burner device 2, in which a gas-air mixture is burnt and the resulting thermal energy is transmitted to the air, which in particular is room air sucked in, and to the fluid. The gas-air mixture consists of combustion air and a gaseous fuel or fuel converted into a gaseous state. The feeding of the fuel and a fuel source (e.g. a gas cylinder) are not shown for better clarity. The feeding of the combustion air is accomplished by the combustion air blower 3. The motor 3' of the combustion air blower 3 is operated at an adjustable speed, whereby the air is sucked in and fed to the burner device 2.

The flue gas generated by the burner device 2 is fed to a heat exchanger 4 in order to transmit the thermal energy to the air to be heated. The heated air is then discharged from the heater 1 via a circulating air blower 5 in order to thereby heat for example an interior space—not shown here. The heat exchanger 4 furthermore is in thermal interaction with a fluid container 6. The fluid—not shown here—for example is service water.

In the illustrated embodiment, a control device 7 acts on the combustion air blower 3, on the burner device 2 and on the circulating air blower 5 in a controlling manner. To do so, the control device 7 accesses a data storage device 8 in which at least two different parameter sets are stored: This on the one hand is a default parameter set and on the other hand a night mode parameter set. The default parameter set for example is associated with a usual day mode. In further embodiments additional parameter sets are present, which describe the control of the components in further modes of the heater 1. The night mode in particular is characterized in that background noise generated by the heater 1 is reduced as far as possible. Hence, noise disturbing during night time will be avoided. Alternatively, the night mode therefore can also be referred to as sleep mode.

For triggering the night mode an input device 9 is provided, which for example is a touch display. However, any other input possibility can be realized, e.g. via a smartphone.

For controlling the components—and hence also the heater 1—two sensors are present here: On the one hand, this is a temperature sensor 10 which here provides for determining the temperature generated by the heater 1 in the vicinity of the circulating air blower 5. In one embodiment, for example, the temperature of the discharged air is determined. In an alternative or supplementary embodiment, the temperature sensor 10 serves for determining the temperature of the fluid container 6. As here the burning behavior of the burner device 2 is controlled as well, an ionization electrode 11 also is present. The ionization electrode 11 serves the measurement of a voltage or current as an indicator of whether a burning process takes place or has been started.

In an alternative embodiment—not shown here—at least four sensors are present, which each allow a temperature measurement. The same include a sensor for measuring the temperature of the liquid; a sensor for measuring the temperature of the air blown out, i.e. the air heated by the heater 1; a sensor for the temperature of the room air, i.e. the air to be heated; and a sensor for measuring the temperature of the combustion air with which the fuel is mixed for the burning process.

There is also provided an indicating unit 12 via which the control device 7 outputs information for a user, the implementation of which can effect further reductions of the background noise.

The invention claimed is:

1. A heater, comprising:
a burner device, a combustion air blower, a circulating air blower, and a device having at least a data storage device,
wherein the combustion air blower feeds combustion air to the burner device,
wherein the burner device burns a gas-air mixture consisting of the combustion air and a gaseous fuel or fuel converted into a gaseous state,
wherein the burner device at least serves for heating air,
wherein the circulating air blower discharges heated air from the heater,
wherein the device is configured to act on at least one component of the heater,
wherein the data storage device stores at least one night mode parameter set associated with an operation of the heater in a night mode and a default parameter set associated with an operation of the heater in a mode different from the night mode,
wherein after activation of the night mode, the device is configured to access the associated night mode parameter set and uses the same for acting on the at least one component of the heater,
wherein the night mode parameter set effects a reduction of background noise generated by the heater,
wherein the device is configured to receive an acceleration time period from the night mode parameter set such that in a case that the device increases the circulating air blower to a specified setpoint speed, the device increases the speed to the specified setpoint speed within the acceleration time period,
wherein the acceleration time period is greater than an acceleration time period of the default parameter set,
wherein the device is configured to receive a lower temperature tolerance value from the night mode parameter set,
wherein in the case that a temperature dependent on the heater is lower than a specifiable temperature setpoint value by more than the lower temperature tolerance value, the device is configured to control the heater in a correcting manner, and
wherein an amount of the lower temperature tolerance value is greater than an amount of a lower temperature tolerance value of the default parameter set.

2. The heater according to claim 1,
wherein the device is configured to receive an upper temperature tolerance value from the night mode parameter set,
wherein in the case that a temperature dependent on the heater is higher than a specifiable temperature setpoint value by more than the upper temperature tolerance value, the device is configured to control the heater in a correcting manner, and
wherein an amount of the upper temperature tolerance value is greater than an amount of an upper temperature tolerance value of the default parameter set.

3. The heater according to claim 1,
wherein the device is configured to receive a temperature tolerance range from the night mode parameter set,
wherein in the case that a temperature dependent on the heater lies outside the temperature tolerance range by a specifiable temperature setpoint value, the device is configured to control the heater in a correcting manner, and
wherein an amount of the temperature tolerance range is greater than an amount of a temperature tolerance range of the default parameter set.

4. The heater according to claim 1,
wherein the heater can be operated at a plurality of power levels,
wherein the device is configured to receive an upper temperature limit value from the night mode parameter set, and
wherein in the case that a temperature dependent on the heater is higher than a specifiable temperature setpoint value by more than the upper temperature limit value, the device reduces a set power level of the heater to a lower power level and maintains an existing burning process of the burner device.

5. The heater according to claim 1,
wherein the heater can be operated at a plurality of power levels,
wherein the device is configured to receive a limit power level from the night mode parameter set, and
wherein the device is configured to permit operation of the heater at only one power level which is lower than the limit power level.

6. The heater according to claim 1,
wherein the circulating air blower can be operated at a plurality of power levels,
wherein the device is configured to receive a circulating air blower power level from the night mode parameter set,
wherein in the case that heated air is to be discharged from the heater, the device sets the circulating air blower to the circulating air blower power level, and
wherein the circulating air blower power level is the lowest power level of the plurality of power levels of the circulating air blower.

7. The heater according to claim 1,
wherein the device is configured to receive a burner start scheme from the night mode parameter set for starting a burning process of the burner device and uses said scheme for starting a burning process,
wherein the burner start scheme of the night mode provides at least the following steps:
in an initialization step, as part of the night mode, varying the speed of a motor of the combustion air blower, until the burning process starts in the burner device,
storing the speed at which the burning process starts as a default value in the data storage device, and
on start of the burning process in the night mode, setting the speed of the motor to the default value, and
according to a burner start scheme of the default parameter set, varying the speed of the motor at each start of the burning process, until the burning process starts in the burner device.

8. The heater according to claim 1,
wherein the device is configured to receive a reduction value from the night mode parameter set, and
wherein on control of the burner device to a specified temperature setpoint value, the device is configured to control the burner device to the temperature setpoint value reduced by the reduction value.

9. The heater according to claim 1,
further comprising a fluid container containing a fluid,
wherein the burner device serves for heating air and for heating the fluid contained in the fluid container,
wherein the device is configured to receive a prioritization from the night mode parameter set, and wherein in the case that air and fluid are to be heated at the same time, the device is configured to control the component of the heater in dependence on the prioritization such that a thermal energy generated by the burner device primarily serves for heating the air or for heating the fluid.

10. The heater according to claim 9, wherein the prioritization is such that the thermal energy primarily serves for heating the air.

11. The heater according to claim 1, wherein the device is configured to receive a display information from the night mode parameter set and transmits the same to an indicating unit for display.

12. A heater, comprising:
a burner device, a combustion air blower, a circulating air blower, and a device having a data storage device,
wherein the combustion air blower feeds combustion air to the burner device,
wherein the burner device burns a gas-air mixture consisting of the combustion air and a gaseous fuel or fuel converted into a gaseous state,
wherein the burner device at least serves for heating air,
wherein the circulating air blower discharges heated air from the heater,
wherein the device is configured to control at least one component of the heater,
wherein the data storage device stores at least one night mode parameter set associated with an operation of the heater in a night mode and a default parameter set associated with an operation of the heater in a mode different from the night mode,
wherein after activation of the night mode, the device is configured to access the associated night mode parameter set and uses the same for acting on the at least one component,
wherein the night mode parameter set effects a reduction of background noise generated by the heater,
wherein the device is configured to receive a burner start scheme from the night mode parameter set for starting a burning process of the burner device and uses said scheme for starting a burning process,
wherein the burner start scheme of the night mode provides at least the following steps:
in an initialization step, varying the speed of a motor of the combustion air blower via the device, until the burning process starts in the burner device,
storing the speed, via the device at which the burning process starts as a default value in the data storage device, and
during starting of the burning process in the night mode, receiving the stored default value from the data storage device, via the device, and setting the speed of the motor to the default value, and
wherein according to a burner start scheme of the default parameter set, the device is configured to vary the speed of the motor at each start of the burning process, until the burning process starts in the burner device.

13. A heater, comprising:
a burner device, a combustion air blower, a circulating air blower, a device having a data storage device, and a fluid container,
wherein the combustion air blower feeds combustion air to the burner device,
wherein the burner device burns a gas-air mixture consisting of the combustion air and a gaseous fuel or fuel converted into a gaseous state,
wherein the burner device at least serves for heating air,
wherein the circulating air blower discharges heated air from the heater,
wherein the device is configured to control at least one component of the heater,
wherein the data storage device stores at least one night mode parameter set associated with an operation of the heater in a night mode and a default parameter set associated with an operation of the heater in a mode different from the night mode,
wherein after activation of the night mode, the device is configured to access the associated night mode parameter set and uses the same for acting on the at least one component,
wherein the night mode parameter set effects a reduction of background noise generated by the heater,
wherein the burner device serves for heating air and for heating a fluid contained in the fluid container,
wherein the device is configured to receive a prioritization from the night mode parameter set,
wherein in the case that air and fluid are to be heated at the same time, the device is configured to control the component of the heater in dependence on the prioritization such that a thermal energy generated by the burner device primarily serves for heating the air or for heating the fluid, and
wherein the prioritization is such that the thermal energy primarily serves for heating the air.

* * * * *